Figure 1:
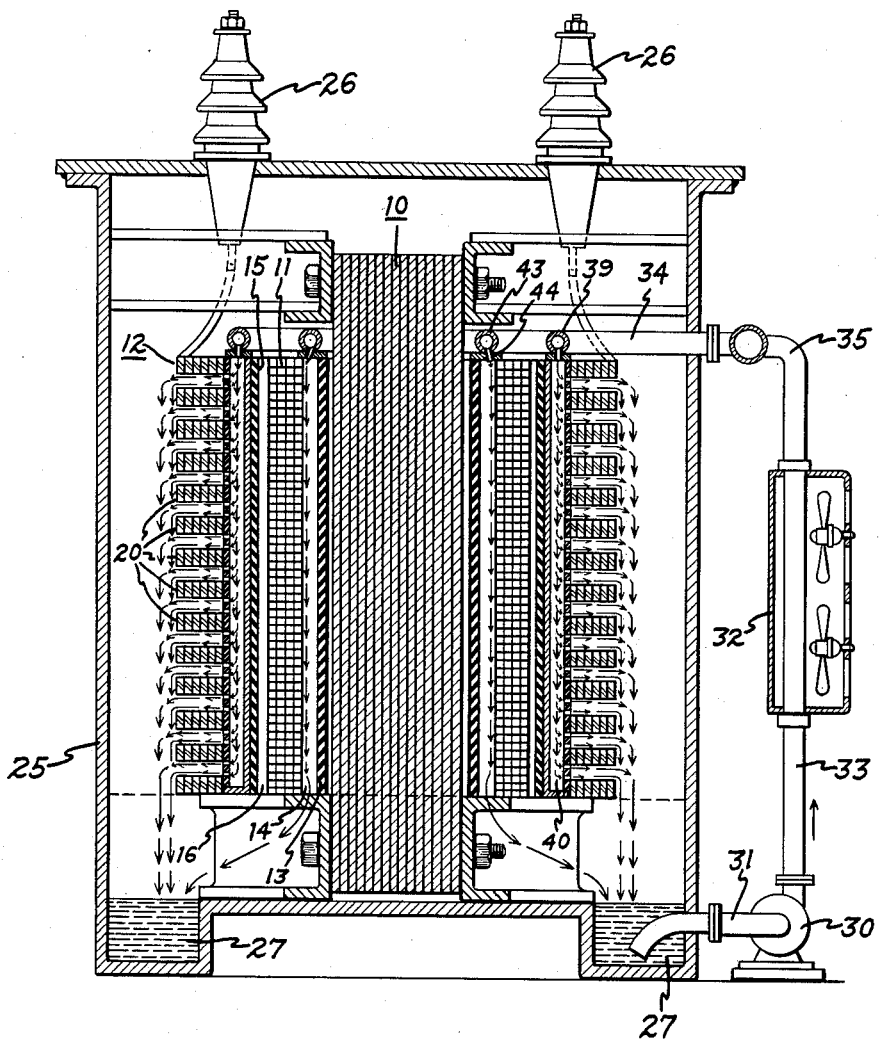

April 3, 1962 G. CAMILLI 3,028,566
COOLING SYSTEM FOR ELECTRICAL INDUCTION APPARATUS
Filed Oct. 8, 1958 2 Sheets-Sheet 2
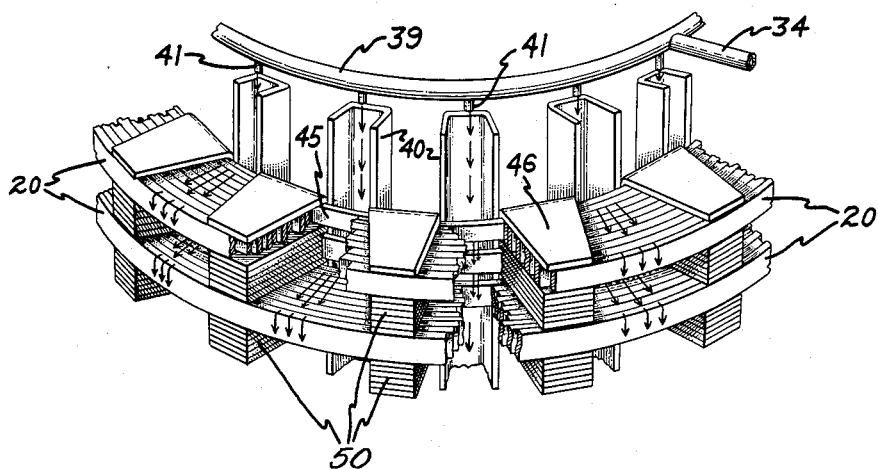
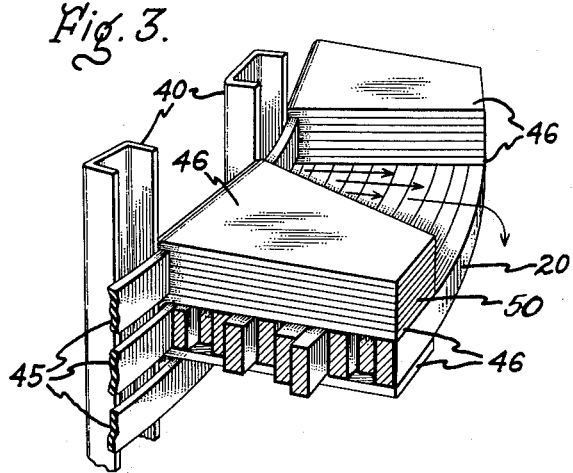
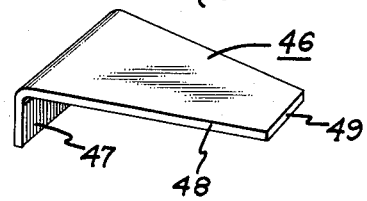
Inventor,
Guglielmo Camilli,
by Gilbert P. Tarleton
His Attorney.

United States Patent Office 3,028,566
Patented Apr. 3, 1962

3,028,566
COOLING SYSTEM FOR ELECTRICAL INDUCTION APPARATUS
Guglielmo Camilli, Pittsfield, Mass., assignor to General Electric Company, a corporation of New York
Filed Oct. 8, 1958, Ser. No. 766,060
16 Claims. (Cl. 336—57)

This invention relates to stationary electrical induction apparatus, and more in particular to an improved cooling system for stationary electrical induction apparatus such as transformers and the like.

Transformers for use on electrical power systems generally comprise an electrical winding surrounding a winding leg of a magnetic core. The winding may be helical, or it may comprise a plurality of axially spaced apart coaxial coils. With the passage of current through the winding, heat is developed therein, and means must be provided to dissipate the heat in order to maintain the apparatus at a safe operating temperature. It is, of course, essential also that the means for dissipating the heat does not so reduce the dielectric strength of the medium surrounding the winding that breakdown of the dielectric medium may occur.

In one commonly employed arrangement for cooling electrical windings, the winding is immersed in a dielectric liquid in a sealed enclosure. The dielectric liquid may, for example, be transformer oil, or various synthetic dielectric liquids such as askarel. By circulating the dielectric liquid through the enclosure and an external circulation system including a radiator, the dielectric liquid serves the function of cooling the windings as well as providing the necessary dielectric strength between points of potential difference in the winding. While liquid dielectrics are generally satisfactory, they do present certain disadvantages. For example, the volume of liquid required to fill the transformer enclosure is sufficiently great that the total weight of the apparatus is materially increased. This increases the difficulty of transporting and installing the transformer. When transformer oil is employed as the dielectric medium the inflammability of the material necessitates either the mounting of the transformer outside, or the providing of extinguishing apparatus. Although other dielectrics such as askarel are not inflammable, these materials are more expensive than transformer oil.

With the advent of high dielectric strength gases such as sulfur hexafluoride, the advantages of employing such materials in stationary electrical induction apparatus has become apparent. For example, the weight of the apparatus may be greatly reduced, noise is not transmitted as readily through the gas as through a liquid, and in addition materials such as sulfur hexafluoride are not inflammable. In addition, the dielectric strength of some of the gases is materially greater than that of the conventionally employed liquids, and thus the use of such gaseous materials facilitates the design of higher voltage apparatus. These advantages are accompanied, however, by the disadvantage that the relatively low density of the material results in greatly reduced thermal efficiency in the circulation system, so that the gas flow through the apparatus and the external radiator must be greatly increased in order to dissipate the necessary quantity of heat to maintain the apparatus temperature within safe operating limits.

In order to overcome these difficulties of cooling gas-filled transformers, it has been suggested that certain volatile liquid dielectric materials be sprayed or otherwise distributed on the windings, and that the cooling of the windings be accomplished by vaporization of the liquid. In this type of arrangement, the vapors serve as the gaseous dielectric material, and these vapors are circulated through an external circulation system where they are condensed prior to distributing them again over the apparatus windings. This system also has a number of disadvantages. For example, while the vapors provide sufficient dielectric strength for the apparatus when the apparatus is above the boiling temperature of the dielectric material, it is necessary to include an additional gaseous dielectric material in the enclosure to provide the necessary dielectric strength when the apparatus is below the normal operating temperature, and it is further necessary to provide reservoir means for the additional gaseous dielectric material when the apparatus is heated and aforesaid vapors comprise the major dielectric material of the apparatus. Since the removal of heat from the apparatus is dependent also upon the condensing of the vapors in an external radiator system, this arrangement also has the disadvantage of the all gas-filled type of apparatus in that the thermal efficiency in the external radiator is decreased due to the relatively low density of the vapor. As a further disadvantage of this arrangement, the dielectric materials having the necessary properties for such type of operation are presently very costly.

Thus, while the latter two arrangements employing gas or vapor dielectric material provide advantages over the liquid dielectric systems in regard to the weight of the apparatus, non-inflammability of the material, and low noise since apparatus vibrations are not readily transmitted through the dielectric medium, their disadvantages as aforestated have been sufficiently great that their usage has been comparatively small as compared with liquid-filled transformers.

A further disadvantage arises in the vapor dielectric type of transformer when the coils are of the type comprising a plurality of axially spaced apart coaxial disc-shaped coils. The disadvantage arises in the difficulty of distributing the dielectric liquid over the coils, since the spacing between the adjacent coils may not be accurately predetermined prior to assembly of the apparatus due to the fact that the spacing between the coils may vary with axial clamping pressure which is applied to the coils during assembly and therefore a distribution system having fixed nozzles for distributing the fluid over the coils would not necessarily be in alignment with the coils after clamping.

It is therefore an object of this invention to provide an improved gas-insulated electrical induction apparatus.

Another object is to provide means for cooling stationary electrical induction apparatus of the type immersed in a gaseous dielectric material, the cooling means not relying upon the removal of heat from a gaseous medium for cooling the apparatus.

A further object of this invention is to provide an economical arrangement for cooling the windings of a gas-insulated transformer, the cooling arrangement not materially effecting the advantages of the gas-insulated transformer from the standpoints of weight, inflammability, and low noise.

A still further object of this invention is to provide an improved economical means for cooling a gaseous dielectric insulated transformer, the cooling system being characterized in that no reservoirs are required on the transformer tank for the purposes of enclosing gaseous dielectric material employed primarily as a dielectric only when the apparatus is below normal operating temperatures.

A still further object of this invention is to provide means for distributing a liquid on the coils of a gas-insulated transformer, the distributing means being characterized by the fact that the flow of liquid on the windings is not affected by variations in clamping pressure on the coils.

Briefly stated, in accordance with the invention, I provide a stationary electrical induction apparatus such as a transformer and the like, comprising a winding disposed in a sealed enclosure and surrounded by an inert non-condensable gaseous dielectric material. A non-volatile dielectric liquid is also provided in the enclosure, and means are provided for flowing a thin layer of the liquid over the winding. External circulation system means such as a radiator mounted on the external side of the enclosure means, are provided for removing heat from the liquid.

In the preferred embodiment of my invention, the apparatus winding comprises a plurality of disc-shaped axially spaced apart coils surrounding an insulating cylinder in the enclosure. A plurality of axially extending spacing means radially separate the coils from the cylinder. The circulation system withdraws the liquid from a sump in the bottom of the enclosure, forces it through the external radiator, and thence into one end of the spacing means. The spacing means are channel-shaped, with the open sides of the channel-shaped spacing means being toward the coils so that liquid is distributed in a thin layer on the coils from the spacing means.

While the specification concludes with claims particularly pointing out and distinctly claiming the subject matter which I regard as my invention, it is believed that the invention will be better understood from the following description taken in connection with the accompanying drawings.

In the drawings:

FIG. 1 is a cross-sectional view of a gaseous dielectric insulated transformer embodying the cooling arrangement of my invention, FIG. 2 is a perspective view of a portion of the winding of a transformer according to one embodiment of my invention, FIG. 3 is an enlarged partially cross-sectional view of the coil arrangement of FIG. 2, and FIG. 4 is a perspective view of one form of spacer employed in the transformer of FIG. 2 and 3.

Referring now to the drawings, and more in particular to FIG. 1, therein is illustrated a transformer comprising a magnetic core 10 of conventional construction. A winding leg of the core 10 is surrounded by a low voltage winding 11 and a high voltage winding 12. The low voltage winding is spaced apart radially from the core leg by an insulating cylinder 13, and the winding 11 may be radially spaced by any conventional means such as axially extending spacing members from the cylinder 13 in order to provide a duct 14 adapted for the flow of a cooling fluid. The high voltage winding is disposed radially outwardly of the low voltage winding 11, and is separated therefrom by another insulating cylinder 15. A cooling duct 16 may be also provided between the low voltage winding 11 and the cylinder 15. The high voltage winding 12, as illustrated in the embodiment of my invention shown in FIG. 1, is comprised of a plurality of axially spaced apart coaxial coils 20. The coils 20 are radially spaced from the cylinder 15 by means that will be more fully disclosed in the following paragraphs. The windings and core are enclosed in an enclosure or tank 25 which may be of any conventional construction, and electrically insulating bushings 26 mounted on the tank 25 are provided in order to facilitate external connection to the transformer windings, accordingly to the conventional practice. A sump 27 is provided in the tank 25 for a purpose to be more fully disclosed in the following paragraphs.

An external circulation system is connected to the tank 25, and comprises a pump 30 of any conventional structure, a conduit 31 extending from the pump 30 to the sump 27, a radiator 32 of any conventional structure, a conduit 33 joining the pump 30 to the radiator 32, a distributing assembly 34 disposed within the transformer tank 25 above the windings, and a conduit 35 connecting the radiator 32 to the distributing assembly 34. The pump 30 is arranged to withdraw liquid from the sump 27, force it upwardly to the conduit 33, radiator 32, and conduit 35 to the distributing assembly 34.

As shown in FIG. 1, the high voltage coils 20 are radially separated from the cylinder 15 by means of axially extending spacing members 40. The spacing members 40 are preferably uniformly distributed about the periphery of the cylinder 15, and as illustrated in FIGS. 2 and 3, the spacing members 40 are channel shaped with the open sides extending radially outwardly. As illustrated in FIGS. 1 and 2, the distributing means 34 may comprise annular tubes disposed above the windings, the annular tube means having downwardly extending tubular projections 41 for introducing liquid into the upper ends of the channel shaped spacing members 40. As shown in FIG. 1, the spacing members 40 are preferably closed at the bottom in order that any liquid flowing therein must flow radially outwardly through the high voltage coils 20. It is also preferred as illustrated in FIG. 1 that the upper ends of the spacing members 40 be closed except where the tubular projections 41 enter them in order that the liquid is forced through the spacing members 40. Other annular tube members 43 having downwardly extending tubular projections 44, may also be provided to direct liquid from the distributing system 34 into the cooling duct 14 between the low voltage winding 11 and cylinder 13, and if desired the distributing system may also be adapted to direct liquid through the duct 16 between the low voltage winding 11 and the radially outwardly cylinder 15.

As illustrated in FIGS. 2 and 3, the spacing members 40 are surrounded by a plurality of annular strips of flat insulating material 45. The strips 45 are wound tightly around the spacing members 40, and the ends of the strips 45 are firmly held together, by any convenient means such as the application of glue thereto. Radially extending spacing members 46 are inserted between adjacent annular strips 45 between each pair of adjacent axially extending spacing members 40. The radially extending spacers 46, as illustrated in FIG. 4, are L-shaped having short axially extending portion 47 with a length substantially equal to the width of the strips 45, and a radially extending portion 48 with a length substantially equal to the radial build of the coils 20. The width of the base of the spacers 46, i.e., at the junction between the axially extending portion 47 and the radially extending portion 48, is substantially equal to the distance between adjacent axially extending spacers 40. The radially outer extremity 49 of the spacers 46 may have a somewhat reduced width in order that a larger portion of the coils 20 be exposed to the flow of liquids as will be explained in more detail in the following paragraphs.

Referring again to FIGS. 2 and 3, the spacers 46 are inserted between adjacent annular strips 45 so that the axially extending portions 47 lie radially inwardly of the strips 45 between the axially extending spacing members 40, and the spacers 46 are thereby locked against radially outward movement by the strips 45 and against circumferential movement by axially extending strips 40.

As illustrated in FIG. 2, the coils 20 are wound between alternate pairs of axially aligned radially extending spacer groups. The spaces between axially adjacent spacers 46 in which the coils are not wound are filled with spacers 50 which may be glued or otherwise rigidly affixed to the spacers 46. The spacers 50 are in axial alignment with the radially extending portions 48 of the spacers 46, and has substantially the same shape, Since the annular strips 45 extend across the open sides of the channel shaped spacing members 40, they prevent the flow of liquid from the members 40 at all locations except where the members 45 are spaced apart axially by the radially extending spacers 46. Thus, liquid may escape from the channel shaped members 40 only directly below and directly above each coil 20, so that the liquid is distributed in a thin layer on the tops and bottoms of the coils. With this arrangement, the location of the openings through which liquid may flow onto the coils 20 remains constant with respect to the position of the coils 20 regardless of changes in spacing between the coils upon the application of axial clamping pressure to the winding.

In operation, the tank 25 is filled with an inert non-condensable gaseous dielectric material. The material must be inert in order that it does not chemically combine with the insulation or metallic components of the apparatus, and it must be non-condensable within the temperature range to which it may be subject during use of the apparatus. Since the gaseous material serves primarily as an insulating medium, it is also preferable that an electronegative gaseous material be employed in order to obtain the benefits of the higher dielectric strength of such materials. As an example, it has been found that sulfur hexafluoride is a satisfactory gaseous material for this purpose.

Since the gaseous dielectric material has a relatively low density, the removal of heat from the windings of the apparatus of my invention is accomplished by means of a non-volatile dielectric liquid circulated through the apparatus. It is of course necessary that the liquid have high dielectric strength so that the dielectric strength of the gaseous insulating medium is not impaired. A non-volatile liquid, i.e., a liquid that does not boil within the normal operating temperatures of the apparatus, has been employed in my invention to remove the heat from the windings in order to obtain the benefit of the higher density materials in the removal of heat from the windings and dissipation of the heat in the external radiator. Since no substantial quantities of vapor from the liquid occur in the apparatus, the liquid serves primarily only as a coolant, and vapors of the liquid do not replace the gaseous dielectric which serves as an insulating medium regardless of the temperature of the apparatus. As an example of a material suitable for use as liquid coolant in electrical apparatus according to my invention, it has been found that transformer oil may be advantageously employed to serve this function.

The dielectric liquid is pumped by the pump 30 from the sump 27 through the conduits 31 and 33, and thence through the external radiator where it is cooled either by the natural or forced flow of air across the external surfaces of the radiator. The cooled liquid is then forced through the conduit 35 to the annular tubes 39 and 43 in distributing means 34. To cool the low voltage windings 11, the liquid is forced through the downwardly extending projections 44 on the tube 39, so that the liquid flows across the surface of the low voltage windings in the duct 14. It is preferred that the flow into the low voltage winding ducts be sufficiently restricted or that baffles be provided, so that only a thin layer of the liquid flows across the surface of the winding. From the duct 14 the liquid returns to the sump 27.

The liquid is also forced into the channel-shaped spacing members 40 by way of the downwardly extending projections 41 on annular tube 39. Since the spacing members 40 are open only in the regions between the axially spaced apart strips 45, the liquid is then forced to flow into the surfaces of the coils 20. The spaces between the strips 45 are preferably sufficiently small that the liquid is sprayed on the windings, so that a thin layer of the liquid flows on both the upper and lower surfaces of the coils 20. To this end, it may be desirable that one or both of the edges of the strips 45 be beveled in order that the liquid is directed more effectively onto the coil surfaces. After flowing across the coils 20, the liquid returns to the sump 27. While a thin layer of liquid flows across the coil surfaces, the major insulation between the coils is provided by the gaseous dielectric material.

In the electrical apparatus of my invention as disclosed in the preceding paragraphs the advantages accompanying the use of a gaseous dielectric material, such as low weight, low noise transmission, and non-inflammability are obtained without the inherent disadvantages of previous gaseous insulation systems such as difficulty of heat dissipation, high cost of materials, or the necessity of providing additional volume in the enclosure for storing a non-condensable gas when a volatile liquid is also employed as a coolant. In the specific embodiment of my invention, means are provided for distributing a liquid coolant over the apparatus windings, and the flow from the distributing means remains fixed with respect to the windings regardless of the application of axial clamping pressure to the windings.

It will be understood, of course, that, while the form of the invention herein shown and described constitutes the preferred embodiment of the invention, it is not intended herein to illustrate all of the equivalent forms or ramifications thereof. It will also be understood that the words used are words of description rather than of limitation, and that various changes may be made without departing from the spirit and scope of the invention herein disclosed, and it is aimed in the appended claims to cover all such changes as fall within the true spirit and scope of the invention.

What I claim as new and desire to secure by Letters Patent of the United States is:

1. Stationary electrical induction apparatus having a normal operating temperature range comprising a winding in a sealed enclosure and surrounded therein by an inert gaseous dielectric material non-condensable in the enclosure in said normal operating temperature range, a dielectric liquid in said enclosure that is non-volatile in said normal operating temperature range, means for flowing a thin layer of said liquid over said winding, and external circulation system means for removing heat from said liquid.

2. Stationary electrical induction apparatus having a normal operating temperature range comprising a plurality of disc-shaped axially spaced apart coaxial coils in a sealed enclosure, said enclosure being filled with an inert gaseous dielectric material that is non-condensable in the enclosure in said normal operating temperature range for insulating said coils, and means for cooling said coils comprising a dielectric liquid in said enclosure that is non-volatile in said normal operating temperature range, means for flowing a thin layer of said liquid over said coils, and an external circulation system including a radiator for removing heat from said liquid.

3. Stationary electrical induction apparatus having a normal operating temperature range comprising a plurality of disc-shaped axially spaced apart coaxial coils in a sealed enclosure, said enclosure being filled with an inert fluorogas that is non-condensable in the enclosure in said normal operating temperature range to provide insulation for said coils, a dielectric liquid in said enclosure that is non-volatile in said normal operating temperature range, sump means in the bottom of said enclosure, means for flowing a thin layer of said liquid over said coils to remove heat from said coils, and circulation system means for cooling said liquid comprising radiator means, and means withdrawing said liquid from said sump means and forcing it by way of said radiator means to said flowing means.

4. The apparatus of claim 3 in which said fluorogas is sulphur hexafluoride and said liquid is transformer oil.

5. Stationary electrical induction apparatus having a normal operating temperature range comprising a plurality of disc-shaped axially spaced apart coils surrounding an insulating cylinder in a sealed enclosure, a plurality of axially extending spacing means radially separating said coils from said cylinder, said spacing means being channel-shaped, an inert gaseous dielectric material filling said enclosure that is non-condensable in the enclosure in said normal operating temperature range for insulating said coils, a dielectric liquid in said enclosure that is non-volatile in said normal operating temperature range, sump means in the bottom of said enclosure, external radiator means, and circulation system means for withdrawing liquid from said sump means and forcing it by way of said radiator means to one end of said channel-shaped spacing means, the open sides of said channel-shaped spacing means being toward said coils so that said liquid is distributed in a thin layer on said coils from said spacing means to effect the cooling of said coils.

6. Stationary electrical induction having a normal operating temperature range comprising a magnetic core, an insulating cylinder surrounding said core, a plurality of axially spaced apart disc-shaped coils surrounding said cylinder and spaced therefrom by axially extending spacing members uniformly distributed around the outer surface of said cylinder, a sealed enclosure surrounding said core and coils, an inert gaseous dielectric material that is non-condensable in said enclosure in said normal operating temperature range for insulating said coils, a dielectric liquid in said enclosure that is non-volatile in said normal operating temperature range, sump means in the bottom of said enclosure, external radiator means, circulation system means for withdrawing liquid from said pump and forcing it by way of said radiator means to one end of said spacing means, said spacing means being channel-shaped with the open sides thereof facing the radially inner sides of said coils, and baffle means partially blocking the open sides of said spacing members so that liquid flowing into said spacing means is sprayed therefrom in a thin layer onto said coils to effect the cooling of said coils.

7. The apparatus of claim 6 in which said gaseous material is sulphur hexafluoride and said liquid is a transformer oil.

8. In stationary electrical induction apparatus of the type having a plurality of axially spaced apart disc-shaped coils and having a normal operating temperature range, means for insulating said coils comprising an inert gaseous dielectric material in a sealed enclosure surrounding said coils, said gaseous dielectric material being non-condensable in said enclosure in the normal operating temperature range of said apparatus, and means for cooling said coils comprising a dielectric liquid in said enclosure that is non-volatile in said normal operating temperature range, means for distributing a thin layer of said liquid over said coils, and circulation system means for cooling said liquid.

9. Stationary electrical induction apparatus comprising an insulating cylinder, a plurality of channel-shaped axially extending members disposed on the outer surface of said cylinder, the open sides of said channel-shaped members extending radially outwardly, a plurality of axially spaced annular insulating strips closely surrounding said channel-shaped members, and a plurality of axially spaced apart disc-shaped coils closely surrounding alternate annular insulating strips.

10. Stationary electrical induction apparatus comprising an insulating cylinder, a plurality of axially extending channel-shaped spacing members arranged on the outer surface of said cylinder, a plurality of annular insulating strips closely surrounding said channel-shaped members, spacing means extending radially outwardly from between adjacent said channel-shaped members and axially spacing apart said annular insulating strips, and a plurality of axially spaced apart disc-shaped coils closely surrounding alternate annular strips, and means for introducing a dielectric liquid in said channel shaped members.

11. Stationary electrical induction apparatus comprising an insulating cylinder, a plurality of axially extending channel-shaped insulating members uniformly distributed about the outer surface of said cylinder with the open sides thereof facing radially outwardly, a plurality of annular insulating strips closely surrounding said channel-shaped members, radially extending insulating means axially spacing said annular insulating strips and extending radially outwardly between adjacent channel-shaped members so that the open sides of said channel-shaped members are exposed only in the regions between adjacent annular strips, a plurality of axially spaced apart disc-shaped coils closely surrounding alternate annular insulating strips, the axial dimension of said coils being substantially equal to the axial dimension of said strips, said radially extending means extending at least to the outer radial extremities of said coils, insulating means axially separating said coils and rigidly affixed to said radially extending spacing means, and means for introducing a dielectric liquid into said channel-shaped members.

12. The stationary electrical induction apparatus of claim 11 in which said radially extending means are generally L-shaped having an axially extending portion with a length substantially equal to the axial dimension of said annular strips and a width substantially equal to the distance between adjacent channel-shaped members, the axially extending portions of said radially extending spacing means lying against the radially inner surfaces of said annular strips between channel-shaped members.

13. Electrical apparatus having a normal operating temperature range comprising a winding in a sealed enclosure, said winding being surrounded and insulated by an inert gaseous dielectric material that is non-condensable in said enclosure in the normal operating temperature range of said apparatus, a dielectric liquid in said enclosure that is non-volatile in the normal operating temperature range of said apparatus, means for flowing a thin layer of said liquid over said winding, said liquid contacting said winding and removing heat therefrom.

14. Apparatus as recited in claim 13 in which said inert gaseous dielectric material is an electronegative gas and said non-volatile liquid is transformer oil.

15. Apparatus as recited in claim 14 in which said electronegative gas comprises a fluorine compound.

16. Apparatus as recited in claim 15 in which said fluorine compound comprises sulphur hexafluoride.

References Cited in the file of this patent
UNITED STATES PATENTS

| | | |
|---|---|---|
| 2,561,738 | Hill | July 24, 1951 |
| 2,632,041 | Bilodeau | Mar. 17, 1953 |
| 2,734,096 | Ennis | Feb. 7, 1956 |
| 2,831,173 | Whitman | Apr. 15, 1958 |